United States Patent Office 3,257,418
Patented June 21, 1966

3,257,418
DIANHYDRIDE AND PROCESS OF
PREPARATION
George B. Vermont, Wilmington, Del., assignor to E. I.
du Pont de Nemours and Company, Wilmington, Del.,
a corporation of Delaware
No Drawing. Filed Dec. 23, 1964, Ser. No. 420,777
12 Claims. (Cl. 260—346.3)

This invention concerns a new chemical compound and a process for making the compound.

The chemical compound of this invention is tricyclo [4.2.2.0$^{2,5}$]-7-decene-4-phenyl-3,9,10 - trichloro - 3,4,9,10-tetracarboxylic dianhydride. This compound has the structural formula

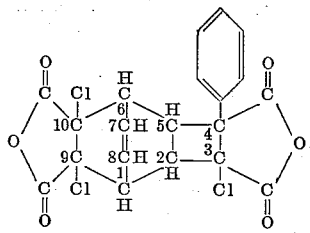

Polyimide capable of forming durable, heat resistant films and solid can be prepared from the compound of this invention by reaction with a diamine.

A process for preparing the dianhydride of this invention consists essentially of A. Exposing to radiant energy consisting essentially of wavelengths of about 2700 to 4000 Angstrom units a solution of (1) dichloromaleic anhydride, (2) benzene and (3) a photosensitizer consisting essentially of an aromatic compound having a carbonyl group attached to the ring, and B. Separating the resulting dianhydride from the reaction product mixture.

Graphical representation of the reaction taking place during the exposure step of this process is as follows:

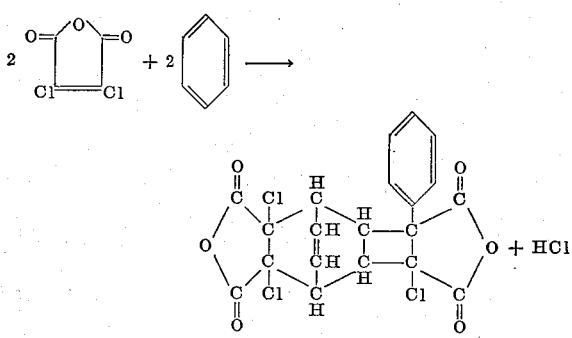 

The dianhydride product forms as a white pricipitate which is separated from the reaction product mixture by filtration, centrifuging, evaporation, etc. Hydrogen chloride gas which can be utilized as a byproduct evolves from the reaction mixture during the exposure step.

Radiant energy for the exposure step of this invention can be obtained from sunlight or from artificial sources. Most of the radiant energy in sunlight has wavelengths of about 2700 to well over 7800 Angstrom units. The relatively small amount or radiant energy in sunlight which has wavelengths below 2700 Angstrom units can be filtered out by the use of material such as borosilicate glass, polyethylene, polytetrafluoroethylene, polyvinylfluoride, etc. Radiant energy having wavelengths gerater than 4000 Angstrom units has no detectable effect on the reaction of this invention. Mercury arc lamps in combination with filter materials are an artificial source of radiant energy consisting essentially of wavelengths of 2700 to 4000 Angstrom units useful in this invention.

Efficiency of the process of this invention is improved when radiant energy consisting essentially of wavelengths of 3000 to 4000 Angstrom units is used. Filters manufactured by the Corning Glass Co., New York, especially Corning filter color code 052, can be used to remove wavelengths shorter than 3000 Angstrom units from sunlight or mercury arc radiation. Low pressure phosphor coated mercury arc lamps which directly produce radiant energy consisting essentially of wavelengths of 3000 to 4000 Angstrom units are also useful.

Carrying out the exposure reaction of the process of this invention under an inert gas such as nitrogen or argon produces a dianhydride of good purity, but the exposure reaction can be carried out under air in which case a dianhydride having some impurities (which reduce its melting point by a few degrees) is produced. The exposure reaction is preferably carried out at room temperature, although a temperature ranging from melting point to boiling point of the mixture of reactants can be used.

An excess of at least about 10% by weight over the stoichiometric weight of benzene is usually used in the process of this invention. This excess serves as a solvent for dichloromaleic anhydride and photosensitizer and as a reaction medium. The stoichiometric weight of benzene is based on theoretical addition of two moles of dichloromaleic anhydride to two moles of benzene. Additional solvents such as cyclohexane or aliphatic ketones such as acetone can be added if desired, but recovery of unused reactants is complicated by the presence of additional solvents.

The term "photosensitizer" is used in this specification to describe compounds which absorb radiant energy to obtain a higher energy level and become excited and then transfer this energy to reactants taking part in a reaction, in accordance with principles of photochemistry. The term "aromatic" is used to describe compounds having a carbocyclic ring possessing resonance. The term "carbonyl" is used in this specification to designate compounds having properties dominantly controlled by a $$-\overset{O}{\underset{}{\overset{\|}{C}}}-$$

group. Typical photosensitizers useful in the process of this invention include aromatic aldehydes such as benzaldehyde as well as the more efficient diaryl ketones having the structural formula $$Ar_1-\overset{O}{\underset{}{\overset{\|}{C}}}-Ar_2$$

in which both $Ar_1$ and $Ar_2$ are aromatic radicals. Preferred diaryl ketones, because of improved reaction rates, are benzophenone, chlorobenzophenone, dichlorobenzophenone, alkylbenzophenones such as methyl benzophenone, ethyl benzophenone, etc.; dialkyl benzophenones such as dimethyl benzophenone, diethylbenzophenone, etc.; hydroxybenzophenone; alkoxybenzophenones such as methoxybenzophenone, etc.; dihydroxybenzophenone; dialkoxybenzophenones such as dimethoxybenzophenone, etc.; and fluorenone. Best reaction rates are obtained when benzophenone is used as the photosensitizer.

A minute quantity of photosensitizer is sufficient to initiate and propagate the reaction of this invention. Reaction rate increases with increasing amounts of photosensitizer, reaching a maximum when there are enough photosensitizer molecules to accommodate all photons in the radiant energy. For most radiant energy sources, including sunlight, photosensitizer quantities of about 0.1% to 4% by weight based on total weight of benzene produce good reaction rates.

The length of time required for the exposure reaction of this invention must be empirically determined for each level of radiant energy intensity, photosensitizer quantity, photosensitizer, and quantity of reactants. Since removal of dianhydride product can be conducted without removing reactants or photosensitizer, a type of continuous process in which product is periodically removed and additional quantities of reactants are periodically added is most efficient. As a guide, about four to six weeks exposure to summer sunlight within a latitude defined by the continental United States of America and benzophenone in preferred proportions is a useful cycle. Exposure periods used in the examples provide an exposure guide for artificial radiant energy.

The following examples further illustrate the dianhydride and process of this invention.

*Example I*

About 12.4 grams of dichloromaleic anhydride and 9.1 grams of benzophenone are dissolved in about 300 milliliters of benzene. The solution is exposed to radiant energy consisting essentially of wavelengths of 3000 to 4000 Angstrom units produced by 16 low pressure phosphor coated mercury arc lamps (code RPR-3500 A obtainable from the Southern New England Ultraviolet Co., Middletown, Conn.) in a Rayonet Photochemical Chamber Reactor built by the Southern New England Ultraviolet Company, for about 96 hours under a nitrogen blanket. Filtration of the resulting mixture followed by washing with benzene produces about 2.3 grams of a white solid.

Melting point of this solid is 286–287° C. with decomposition. Elemental analysis of the solid produces the following data:

Calculated for $C_{20}H_{11}Cl_3O_6$: C, 59.9; H, 2.4; Cl, 23.5. Found: C, 53.1; H, 2.5; Cl, 23.5.

Molecular weight of the solid determined by the cryoscopic method in dimethyl sulfoxide is 595 and by the ebullioscopic method in dioxane is 412. Theoretical molecular weight of tricyclo $[4.2.2.0^{2,5}]$-7-decene-4-phenyl-3,9,10-trichloro-3,4,9,10-tetracarboxylic dianhydride is 454.

Infrared spectrum (in potassium bromide pellets) of the solid of this example has two doublet peaks at 5.348 and 5.556 microns showing the presence of two anhydride groups, a peak at 6.645 microns showing the presence of an aromatic group, and peaks at 13.28 and 14.29 microns showing the presence of a monosubstituted phenyl group.

Nuclear magnetic resonance spectrum (relative to tetramethylsilane) of this solid has a sharp multiplet at a magnetic field intensity of 7.60 parts per million indicating the aromatic protons (hydrogen atoms), a peak at 6.15 parts per million indicating the olefinic protons and two AB patterns at 4.40 and 3.00 parts per million indicating the alicyclic protons. Ratio of the areas under these peaks, which is a measure of the relative amounts present, is 24:10:20 (theoretical ratio for the tricyclo compound of this invention is 5:2:4). The solid of this example is therefore identified as tricyclo $[4.2.2.0^{2,5}]$-7-decene-4-phenyl-3,9,10-trichloro-3,4,9,10-tetracarboxylic-dianhydride.

*Example II*

A solution of about 12.4 grams of dichloromaleic anhydride, 9.1 grams of benzophenone, and 300 milliliters of benzene is prepared as in Example I. This solution is exposed for 77 hours to radiation by the procedure used in Example I except that exposure takes place under air instead of nitrogen. Filtration and washing products 1.9 grams of a solid which decomposes at its melting point of 275° C.

Elemental analysis, molecular weight determinations, infrared spectrum and nuclear magnetic resonance spectrum produce essentially the same data for this solid as the solid of Example I, thereby also identifying this Example II solid as tricyclo $[4.2.2.0^{2,5}]$-7-decene-4-phenyl-3,9,10-trichloro-3,4,9,10-tetracarboxylic dianhydride.

What is claimed is:

1. Tricyclo $[4.2.2.0^{2,5}]$-7-decene-4-phenyl-3,9,10-trichloro-3,4,9,10-tetracarboxylic dianhydride.

2. A process for making the compound of claim 1 which consists essentially of
   A. reacting two molecules of dichloromaleic anhydride with two moleculues of benzene by exposing to radiant energy consisting essentially of wavelengths of 2700 to 4000 Angstrom units a solution of (1) dichloromaleic anhydride, (2) benzene, and (3) a photosensitizer consisting essentially of an aromatic compound having a carbonyl group attached to the ring, and
   B. separating the resulting dianhydride from the reaction product mixture.

3. The process of claim 2 in which the photosensitizer is a diaryl ketone having the structural formula

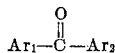

in which both $Ar_1$ and $Ar_2$ are aromatic radicals.

4. The process of claim 3 in which the photosensitizer is from the group consisting of benzophenone, chlorobenzophenone, dichlorobenzophenone, alkylbenzophenone, dialkylbenzophenone, hydroxybenzophenone, alkoxybenzophenone, dihydroxybenzophenonoe, dialkoxybenzophenone, and fluorenone.

5. The process of claim 4 in which the photosensitizer is benzophenone.

6. The process of claim 5 in which the quantity of benzene is at least 10% excess by weight over the stoichiometric weight of benzene.

7. The process of claim 6 in which the quantity of photosensitizer is about 0.1% to 4% by weight based on total weight of benzene.

8. The process of claim 7 in which the exposure step is carried out under an inert gas.

9. The process of claim 8 in which the radiant energy consists essentially of wavelengths of 3000 to 4000 Angstrom units.

10. The process of claim 2 in which the quantity of benzene is at least 10% excess by weight over the stoichiometric weight of benzene.

11. The process of claim 2 in which the quantity of photosensitizer is about 0.1% to 4% by weight on total weight of benzene.

12. The process of claim 2 in which the radiant energy consists essentially of wavelengths of 3000 to 4000 Angstrom units.

References Cited by the Examiner

Schenck et al., Tetrabedron Letters, No. 21 (1960), pages 1–8.

HENRY R. JILES, *Primary Examiner.*